March 17, 1925.

E. A. SMITH ET AL 1,529,931

STEAM ENGINE LUBRICATOR

Filed April 30, 1923

Patented Mar. 17, 1925.

1,529,931

UNITED STATES PATENT OFFICE.

EDGAR A. SMITH AND NORMAN H. MOORE, OF WICHITA FALLS, TEXAS.

STEAM-ENGINE LUBRICATOR.

Application filed April 30, 1923. Serial No. 635,706.

*To all whom it may concern:*

Be it known that we, EDGAR A. SMITH and NORMAN H. MOORE, citizens of the United States, residing at Wichita Falls, in the county of Wichita and State of Texas, have invented a new and useful Steam-Engine Lubricator, of which the following is a specification.

The invention relates to an automatic steam engine lubricator that operates entirely automatically, the flow of oil increasing and decreasing with the speed of the engine.

A further object of the invention is to provide a device of this nature that is very simple and practical and can be manufactured and sold at a very nominal cost.

The nature and advantages of the invention will be better understood when the following detail description is read in connection with the accompanying drawing forming a part of this application. The invention resides in the construction, combination and arrangement of parts as claimed.

Figure 1:
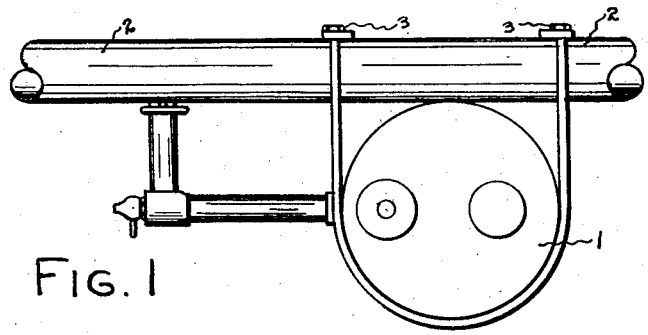

In the accompanying drawing the various parts will be referred to by numbers, and therein Figure 1 is a top view.

Figure 2:
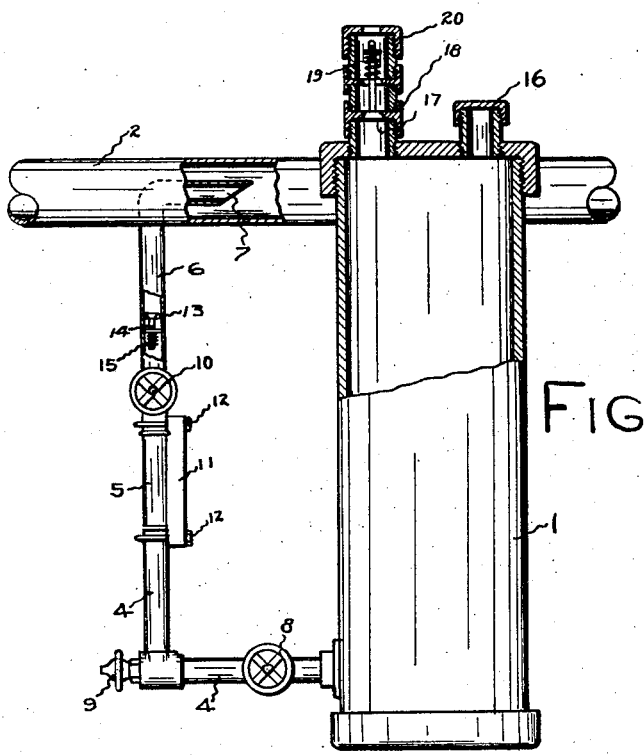

Figure 2 is a side view, partly sectioned.

The device forming the subject matter of this invention comprises a reservoir 1, which is attached to the steam pipe 2 with U bolts, as illustrated at 3. 4 is a pipe leading from the tank 1 to the sight feed glass 5. 6 is a pipe leading from the sight feed glass 5 to the steam pipe 2, terminating about the center thereof, the opening of the pipe 6 being toward the point of steam consumption. The end of the pipe 6 in the steam pipe 2 is cut in a slanting position, as illustrated at 7. 8 is an adjusting valve. 9 is a drain cock. 10 is a cutoff valve. 11 is a brace attached to the pipe 4 and the pipe 6 with U bolts, as illustrated at 12. 13 is a valve seat arranged in the pipe 6. 14 is a valve having association therewith. 15 is a coil spring for the purpose of keeping the same closed. 16 is a filler cap on the reservoir 1. 17 is a valve arranged in the valve seat 18 on the reservoir 1. 19 is a coil spring arranged on the valve 17. 20 is a valve housing.

The device operates in the following manner: The reservoir 1 is filled with oil. The valve 10 is opened. The steam passing through the steam pipe 2 creates a suction in the pipe 6, which opens the valve 14 therein. When the valve 8 is opened the oil is sucked out of the reservoir 1 through the pipes 4 and 6 into the steam pipe 2 where the steam carries it to the engine cylinder. The flow of oil may be regulated with the valve 8 as it passes through the sight feed glass 5. The valve 17 is for the purpose of relieving the vacuum in the reservoir 1 as the oil passes therefrom into the steam pipe 2. It will be noted that as the speed of the engine increases or decreases the suction in the pipe 6 will increase and decrease accordingly, which will regulate the quantity of oil used.

While it is believed from the foregoing description the nature and advantages of the invention will be readily apparent, we desire to have it understood that we do not limit ourselves to what is herein shown and described, and that such changes may be resorted to, when desired, as fall within the scope of what is herein claimed.

What we claim is:

1. In a steam engine lubricator, an oil reservoir, a steam pipe, a pipe connected at one end to the reservoir adjacent its bottom and having its opposite end arranged in the steam pipe and being open and facing in the direction in which the steam travels in the steam pipe, so as to lift the oil into the steam pipe by suction, and means above the oil level for breaking the vacuum created within the reservoir by the egressing oil.

2. A steam engine lubricator as defined in claim 1, in which the pipe extending from said reservoir to said steam pipe, has a sight flow glass disposed intermediate its ends.

3. A steam engine lubricator as defined in claim 1, in which the pipe extending from the said reservoir to the steam pipe, has an automatic valve therein disposed so as to prevent steam from causing a back pressure into said reservoir.

EDGAR A. SMITH.
NORMAN H. MOORE.

Witnesses:
C. B. TONEY, Jr.,
FRED L. BRONSON.